Aug. 30, 1955   G. HEINISH   2,716,397
POWER CONTROL FOR INTERNAL COMBUSTION ENGINE
Filed May 31, 1952   3 Sheets-Sheet 1
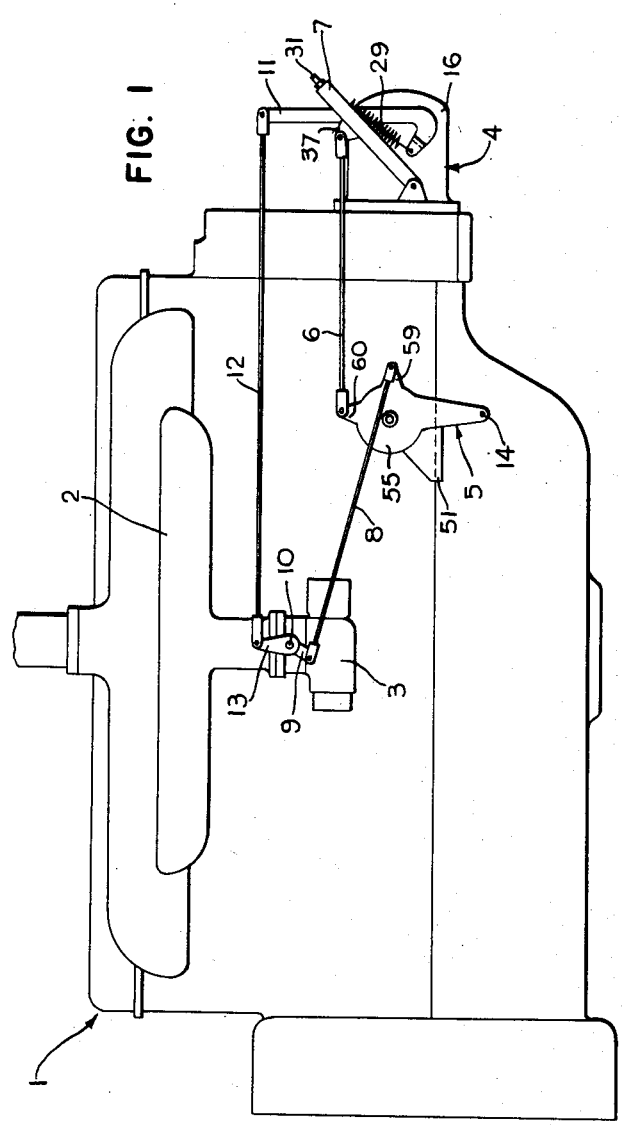
INVENTOR.
GEORGE HEINISH
BY
Oldham & Oldham
ATTORNEYS

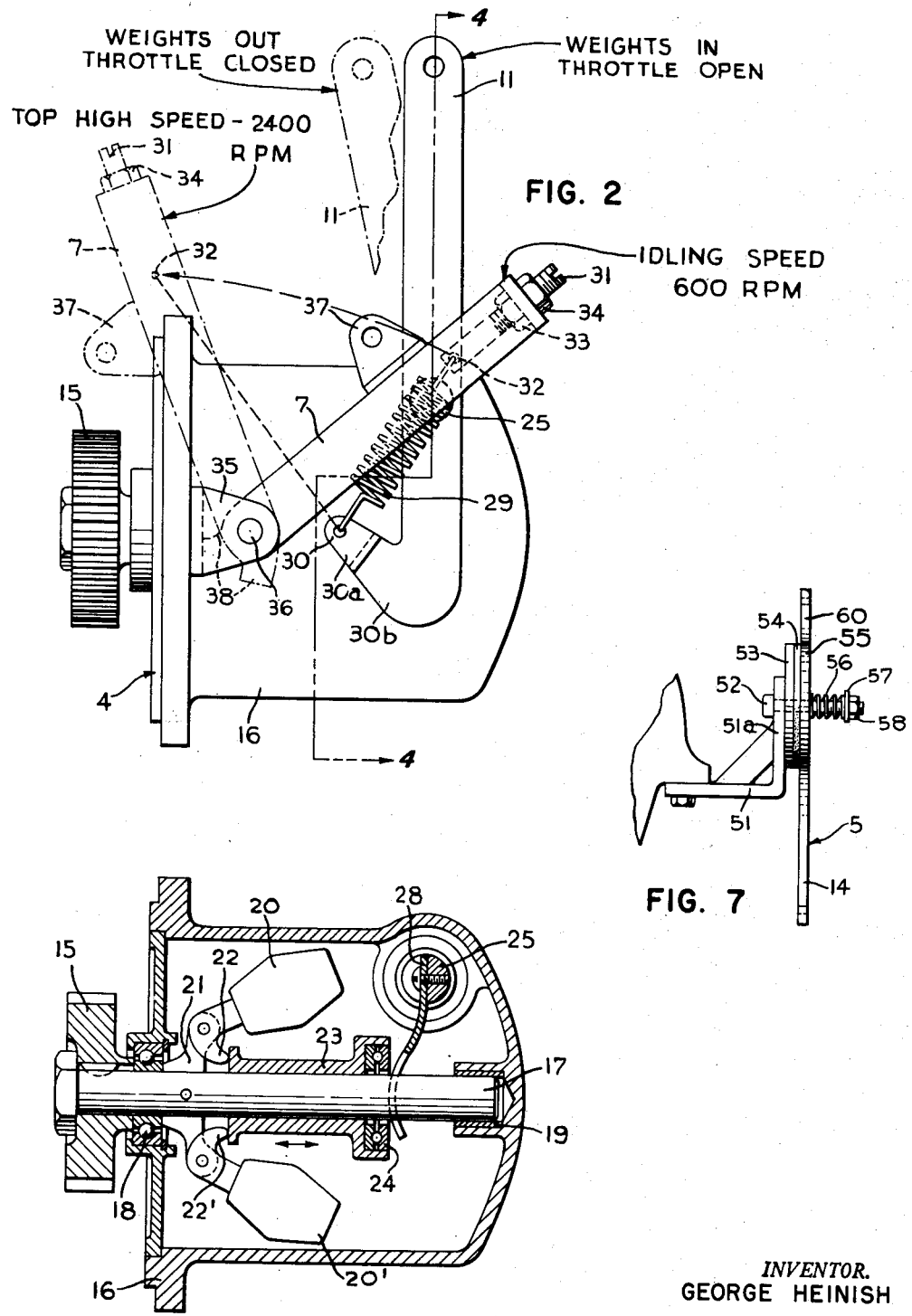

Aug. 30, 1955          G. HEINISH          2,716,397
POWER CONTROL FOR INTERNAL COMBUSTION ENGINE
Filed May 31, 1952                              3 Sheets-Sheet 3

*INVENTOR.*
GEORGE HEINISH
BY
*Oldham & Oldham*
ATTORNEYS

United States Patent Office 2,716,397
Patented Aug. 30, 1955

2,716,397

POWER CONTROL FOR INTERNAL COMBUSTION ENGINE

George Heinish, Akron, Ohio

Application May 31, 1952, Serial No. 290,925

9 Claims. (Cl. 123—108)

This invention relates to well drilling machines that employ internal combustion engines to supply their operating power. It is more particularly concerned with a new means of controlling the speed and the power delivered by the engine in a manner more exactly responsive to the power needs of the machine.

Internal combustion engines of the piston type commonly employ a metering and mixing device for the purpose of combining air with the fuel in proper proportions to form a combustible mixture. Commonly used name for this device is a "carburetor." In addition to their primary mixture purpose carburetors, as usually constructed, also have the secondary functions of controlling the speed and power delivered by the engine. Actually in very many of the applications in practice, carburetors do not perform these latter secondary functions entirely satisfactorily for reasons explained as follows:

The basic operating principles and construction of the conventional carburetors are all the same, and, further they have been used for many years without major change in principle. The liquid fuel is fed into a chamber of the carburetor body where a constant level supply is maintained by means of a float operated needle valve. Air for the mixture enters the carburetor through an air intake opening and then passes into the main body where its velocity is accelerated usually by means of a venturi. Into the air stream, at the high velocity points, the liquid fuel is metered by aspiration through a system of jets and passages. The volume and velocity of the air flow controls the amount of liquid fuel inducted. Since the amount of air that is drawn into the engine depends upon the engine suction which in turn depends upon the speed at which the engine is running, it therefore follows that an increase in speed and/or power can only be obtained by first increasing the air flow to induct additional fuel into the engine.

To assist in obtaining the additional air and fuel mixture necessary to an increase in speed and power, the induction system commonly employs an induction or intake manifold and a throttle valve between the carburetor and the valve ports leading into the engine cylinders. The intake manifold has an inlet to which the carburetor as a whole is attached. The throttle valve is usually built into the carburetor between the carburetor mixing chamber and the carburetor outlet. The mixture passes through the throttle valve, enters the manifold inlet and then passes through a common gallery or passage to the several outlets matching the valve ports. Suction of the engine creates a vacuum condition in the manifold which in turn causes the air to flow into the carburetor under the influence of the atmospheric pressure differential. The vacuum in the manifold is not constant but varies, not only with the speed at which the engine is running but also with the amount of throttling effected by the throttle valve position.

Thus, assuming a specific condition of engine speed and power delivery, to obtain an increase the throttle valve is moved to a more open position. This movement of the throttle valve to increase the effective inlet opening of the intake manifold causes two effects; one, the vacuum in the manifold tends to decrease which tendency is to some extent offset by, two, a larger volume of air passing through the carburetor taking with it a larger amount of fuel. The engine suction then inducts this greater quantity of air and fuel mixture into the engine cylinders whereupon the increased speed and/or power is generated. This control operating sequence naturally causes a lag in time between the actual movement of the throttle valve and the resulting effect on the engine performance. Further this lag effect is more and more pronounced the faster and greater the change is made in the throttle valve movement.

Again, assuming a specific condition of engine speed and power delivery, if a change in the operation of the machine results in a change in the power needed then, without a change in the throttle valve position, there will be a corresponding change in the engine speed. Thus a sudden lightening or entire removal of the load will cause the engine speed to rapidly increase and may even cause it to race up to destructive speeds. On the other hand a sudden or heavy increase in power needed will cause the engine speed to fall and may even cause the engine to stall.

From the foregoing, it is apparent that the operating speed of the engine depends not only on the throttle valve position but also upon the amount of load that is applied to the engine. With the throttle valve wide open, the engine can be made to operate from its highest speed and power down to stalling speed and power simply by increasing the load. Similarly, with the throttle valve practically closed, the engine can be made to operate from a slow speed and medium power to its highest speed simply by lightening the load. Since the speed and power control of the engine that is had by only varying the throttling effect at the carburetor is not a constant effect but produces widely varying results dependent upon the load variations, it follows that the control of the operations of a drilling machine by the simple direct control of the throttle valve of the power unit is not always satisfactory. Some arrangement to secure the automatic control of the power in accord with the loads imposed is highly desirable. This need therefore brings up the subject of engine governors.

Primarily the conventional engine governors have the purpose of protecting the engine from racing and destructive high speeds when the load is removed. These speed limiting governors, operating on the well known centrifugal principle, generally have the speed limiting action secured by balancing the flyweights against a tension spring calibrated for the top speed desired. When that speed is reached, the centrifugal force of the weights overcomes the spring force and the resulting movement of the governor lever acts to reduce the inlet opening either by a closing action, independent of the throttle valve control, on the carburetor throttle valve directly or on a second throttle valve that is in a governor valve body installed between the carburetor and the intake manifold. The governor therefore acts to stabilize the engine top speed irrespective of the load. By combining the action of a governor, selecting a spring to suit the desired operating speed, with the carburetor throttle valve action, a satisfactory power control is obtained for many types of work. This is particularly true of machines that operate at nearly constant speeds such as an electric generator, arc welder, air compressor, etc.

A well drilling machine and particularly a cable tool or percussion drilling machine does not operate at a constant speed. The various operations of drilling, bailing, setting casing and well development require widely varying loads and speeds. For example, the operation of the tools when drilling may require only 10 to 15 H. P. whereas pulling the same tools out of the well at the desired speed may require 50 to 75 H. P. Again, when drilling, it is necessary that the engine speed be fairly easy to control in order to obtain a uniform rhythmic drilling motion of the tools. As the tools are operated at speeds up to 60 strokes per minute and further as the load comes on when the tools are picked up and goes off when they are dropped at each stroke, this means up to 120 power changes each minute. Also, in addition to this large number of power changes, the amount of power needed during each stroke varies from none on the drop portion of the stroke to a peak power demand of from three to six times the average power at the instant of reversal on the pickup stroke.

For many years builders of well drilling machines have found this problem of power control and the means of obtaining an efficient drilling motion a difficult and serious one. Two mechanical principles that the writer has used to assist in solving the problem and to obtain a smooth drilling operation are: one, to obtain power redistribution by the use of energy storage means in the drilling mechanism such as in the use of springs and the like and, two, to obtain speed control by the use of inertia means in the machine driving mechanism such as flywheel effect in the rotating driving members. The use of these devices even to their fullest practical extent, while being of material benefit, are not however fully effective and there still remained a considerable fluctuation in the power demanded from the engine. In an effort to minimize the detrimental effects of the fluctuating power demand, resort is usually made to the use of oversize engines in the drilling machine power unit but these oversize engines are not economical to operate and will frequently stall when drilling in sticky, fractured or conglomerate formations.

Having outlined in some detail the nature of the power control problem in a well drilling machine, I now describe and illustrate by new power control.

The primary object of this new power control is to provide automatic governor controlled changes in the power delivered from the engine in response to the changes in the power needs of the machine.

Another main object is to eliminate engine racing when the load is lightened or removed, that is to provide a control wherein the no load speed of the engine is only slightly greater than the full load speed. Achievement of this object will permit the operator to readily judge the amount of power that the engine will deliver by means of the engine speed.

A secondary object is to eliminate engine stalling when loads are applied within the horsepower capacity of the engine, thus permitting the use of a proper size of engine for more efficient operation.

Another secondary object is to provide a simple mechanism that will modify the operating characteristics of the regular commercial carburetors and governors to achieve the desired control results while at the same time maintaining the low costs and availability of the commercial products.

Another secondary object is to provide a single control for the operator that will simultaneously control both the carburetor throttle valve and the governor.

These and other operating advantages will be described in connection with the following figures.

Fig. 1 is an elevation of an internal combustion engine having the speed range and power control means of the invention associated therewith;

Fig. 2 is an enlarged side elevation of the governor assembly of the invention;

Fig. 3 is a vertical section taken along the governor shaft;

Fig. 7 is an enlarged side view of the control assembly unit associated with the carburetor;

Fig. 8 is a detail section of the control member on the throttle shaft of the carburetor, with the clamp and lever revolved about 180° from their positions in Fig. 1; and Fig. 9 is a detail front elevation, partly broken away, of the control member of Fig. 8.

Figure 4:
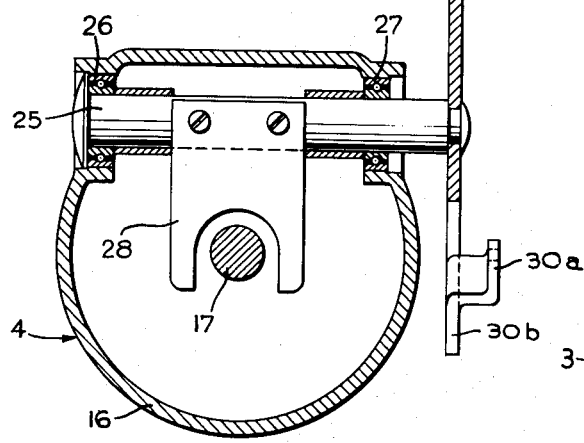
Fig. 4 is an enlarged cross section taken on the line 4—4 of Fig. 2.

The invention relates to a speed range and power control for an internal combustion engine and it includes the combination of a carburetor with a variable speed governor to control the throttle valve of the carburetor, a control lever unit connected to the variable speed governor to control the setting thereof, means at the throttle valve of the carburetor to permit the control of the throttle valve by both the governor and the control lever unit; and means connecting the control lever unit to said first-named means.

Fig. 1 is a general side elevation of an engine for use in the drilling machine power unit. Reference 1 is the engine as a whole, 2 is the intake manifold, 3 is the carburetor, 4 is a new type of variable speed governor, 5 is the new control assembly to which the operator's control is connected and which in turn controls the governor 4 through connecting link 6 and governor control lever 7 and also controls the carburetor 3 through connecting link 8 that operates the limiting lever 9 on the carburetor throttle shaft 10. The governor 4 through the governor lever 11 with connecting link 12 and governor throttle lever 13 also controls the carburetor throttle shaft 10 in a manner to be later described. The operator's control is connected to the control assembly at the lever eye indicated as reference 14. The successful operation of this new power control depends upon the placement of the three main elements 3, 4 and 5 in related positions so that the geometry of the linkage results in the desired movements as described later in detail in connection with enlarged figures.

Fig. 2 is an enlarged side elevation of the governor assembly reference 4. The centrifugal unit which is driven from the engine by means of driving gear 15 is contained in housing 16. Fig. 3 is an enlarged section taken longitudinally of Fig. 2 and shows the details of construction of the centrifugal unit. Fig. 4 is an enlarged cross section taken transversely through the governor lever 11 and its shaft along the line 4—4 of Fig. 2. Referring to Fig. 3, the drive gear 15 rotates the shaft 17 on which is mounted the centrifugal unit. Shaft 17 is carried on bearing 18 and bearing bushing 19 mounted in housing 16. The centrifugal unit proper consists of weights 20 and 20' pivoted to the weight driving member 21 which in turn is pinned fast to the shaft 17. Weight lever ends 22 and 22' bear against thrust collar 23 in the end of which is mounted thrust bearing 24, the whole arrangement being such that movement of the weights 20 and 20' in and out radially will result in axial movement along the shaft of collar 23 and bearing 24. Referring also to Fig. 4, the governor lever 11 is mounted on the outer end and integral with the shaft 25 which in turn is supported in the housing 16 on the bearings 26 and 27. Centrally attached to shaft 25 is the lever 28 the forked ends of which bear against the outer race of bearing 24. Movement of the collar 23 and bearing 24 axially of shaft 17 is, by means of this lever 28, transmitted into rotary oscillation of shaft 25 and this in turn produces the angular movement of governor lever 11 between the two positions indicated as "Throttle open" and "Throttle closed" on Fig. 2.

Obviously the outward movement of the weights 20, 20' will move the governor lever 11 to the "Throttle closed" position but a counterbalancing force is necessary to move the governor lever to the "Throttle open" position. This counterbalancing force is furnished by the tension spring 29 pulling on governor lever 11 in opposition to the centripetal force of the weights. So far none of this is new art in governor design or construction and it is apparent that by selecting the proper spring tension that the engine and consequently the governor speed at which the weights will overcome the spring tension can be also selected. That in fact is all that is required to obtain the usual top limiting speed governor action. It is when, as proposed, movement of the governor lever 11 or governor action is desired throughout the full engine speed range from idling speed up to the top speed limit that the first difficulty is encountered. This full speed range or variable speed governor action requires balancing the centrifugal force of the weights at all speeds and not at just the top speed. The difficulty lies in the fact that the force developed by the weights varies as the square of the speed whereas spring loads vary directly with the deflection or movement. In order to overcome this difficulty, I mount the tension spring on my governor in such a manner that the spring load, while changing uniformly with its deflection within itself, applies a variable force or torque on lever 28 due to the variable position of the spring 29 and the variable direction the spring 29 pulls on lever 11.

The spring 29 is provided with end loops which connect it between the short end of lever 11 at point 30 and the spring adjusting screw 31 at its eye end 32. The adjusting screw 31 is locked in position in governor speed control lever 7 by lock nuts 33 and 34. The governor speed control lever 7 is a forked type lever and is pivoted to the governor housing 16 on ears 35 by means of pivot pins 36. Point 30 is formed in an offset section 30ª in a substantially L-shaped end 30ᵇ of the lever 11 so that the spring 29 can be positioned intermediate the forks of the lever 7. The lever 7 is also provided with an eye ear 37 to which the connecting link 6, Fig. 1, is attached and positioning lugs 38 at pivot 36 end which lugs 38 bear against the inner base surface of ears 35 when the lever 7 is in its idling speed position. The spring adjusting screw 31 is not used to adjust the engine idling speed which is actually determined and adjusted at the carburetor, rather adjusting screw 31 is provided to take care of manufacturing tolerance variation in spring 29 and to adjust the spring tension to the governor weights at the idling speed. This is done with the lever 7 in the idling position with lugs 38 against the stop surface of ears 35. Now as the lever 7 is advanced from the idling speed position to the left toward the top high speed position, not only is the tension in the spring increased due to the relative positions of points 30 and 36, but also the angle formed between the points 25—30 and 30—32 is increased as the top end of spring 29 is swung to the left and thus increasing the effective pull of the spring on the end 30 of the lever 11. Thus by the proper selection of the points 30, 32 and 36 relative to shaft 25 and the use of a proper size spring, the force of the governor weights can be balanced by the tension in the spring within narrow speed limits throughout the engine speed range from idling to top high speed.

Now if the governor lever 11 is connected to the carburetor throttle and if the governor speed control lever 7 is connected to the operator's control lever, it is possible to obtain a full range of engine speed under governor control i. e. for any speed selected the governor would tend to stabilize the engine at that speed irrespective of the load applied within the capacity of the engine. In operation, this variable speed governor control would function as outlined in the following:

First, the operator would select an engine no load speed suitable to the job he wanted to do. He does this by moving his engine speed control so as to set the governor speed control lever 7 in a position somewhere between the idling and top speed positions that will result in the desired engine speed. At this setting the governor weight force and the governor spring tension will be in balance with the governor lever 11 being in the "throttle closed" position or very nearly so, for it is to be remembered that for all speeds from idling to top high speed that the carburetor throttle will be practically closed under no load conditions.

Second, the operator proceeds to engage the machine to the work by means of engaging a friction clutch or the like that controls the work operation.

Third, as the load comes on the machine, there will be a definite slowing down of the machine and its engine rotational speeds since the fuel supply to the engine is not being changed.

Fourth, as the engine and its governor speed falls off, the governor weights lose some of their centrifugal force whereat the tension in the governor spring being then unbalanced will cause a movement of the lever 11 toward the "throttle open" position thus closing in the weights and simultaneously opening the carburetor throttle to permit more fuel mixture to enter the engine and there create the added power needed to balance the work being done.

From the foregoing it can be seen that this variable speed governor control of the carburetor throttle valve would automatically vary the engine power delivery in accordance with the load demands by varying the throttle valve position to suit and, in addition, engine racing would be eliminated and stalling minimized. It would appear that this would be the answer to the problems for by controlling the governor over a range of speed instead of only at a top limiting speed and then having the governor control the carburetor throttle, the objectives appear to have been reached. Unfortunately, this did not prove out in practice. I have built some well drilling machines with this type of power control and while the performance was greatly improved for such work as the hoisting operations, setting well casing, bailing, swabbing or the like, it was definitely very poor when drilling. So that this power control could not be used until a way was found to make it function when drilling.

The reasons why a direct variable speed governor control cannot be used when drilling are easy to understand. Commercial governors are primarily designed to maintain an engine operating at constant speeds with the measure of the governors' efficiency being the closeness of the speed regulation, 3 to 5% being not uncommon. Therefore, the governors are extremely sensitive to speed changes. On the other hand, the governor does not, in the final analysis, directly control the engine's performance; all that the governor does is to respond to the engine speed variations caused by the load variations and then it operates to change the throttle valve. The carburetor and its throttle valve then, again indirectly, controls the engine's performance by controlling the fuel intake. As previously pointed out, there is a time lag between the carburetor throttle valve changes and the actual performance response of the engine to those throttle valve changes. This time lag is an inherent fault in the fuel induction system of engines and is well recognized by anyone familiar with the art. The fact is that, whereas the governor is extremely sensitive to speed changes and quickly responds by moving the throttle valve, the engine induction system, on the other hand, is very much slower and does not respond fast enough to instantaneously follow the governor action.

So we find in practice when drilling that the power and speed changes caused by the drilling action of the tools are so fast that the engine is responding to the changes induced by one stroke of the drilling tools at a time when the succeeding stroke is already taking place. This "out of phase" condition means that the governor will have the carburetor throttle valve closed at the time when the dropping tools must be picked up for the next stroke. The result is a sudden extreme power demand which the engine must satisfy or stall, the engine speed drops sharply off, the governor snaps the throttle valve open, there is a surge of power and the drilling tools are violently jerked upward spoiling the drilling motion. This condition is further aggravated by the fact that the governor responds to considerable speed changes by snapping the governor lever 11 all the way from the "throttle closed" to the "throttle open" positions and thus varies the engine speed and power characteristics over their entire range. Since, as pointed out before, the drilling operation only requires from 1/5 to 1/4 of the power available from the usual drilling machine engine, the effect, created by the governor suddenly opening wide the throttle valve, can be readily appreciated when one realizes that four or more times as much power as is necessary is poured into the machine. To match the action of the governor one would have to use a small engine having only the maximum power needed for the drilling operation, but then a larger engine is needed for most of the other work incident to well drilling. Since the use of two engines is not practicable, obviously some arrangement is required to limit the governor action during the drilling operation so as to permit drawing only sufficient power for the drilling operation from an engine large enough to do all of the work. At the same time the power control arrangement should permit the use of the entire engine power when needed. My invention resides in accomplishing exactly this power control by a simple modification of the carburetor 3 throttle valve control in conjunction with the use of the variable speed governor 4 and the new control assembly 5.

Figure 6:
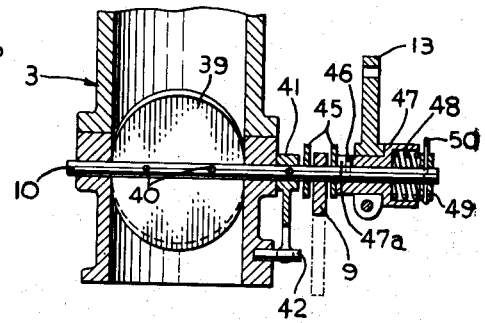
Fig. 6 is an enlarged vertical section taken on line 6—6 of Fig. 5.
Figure 5:
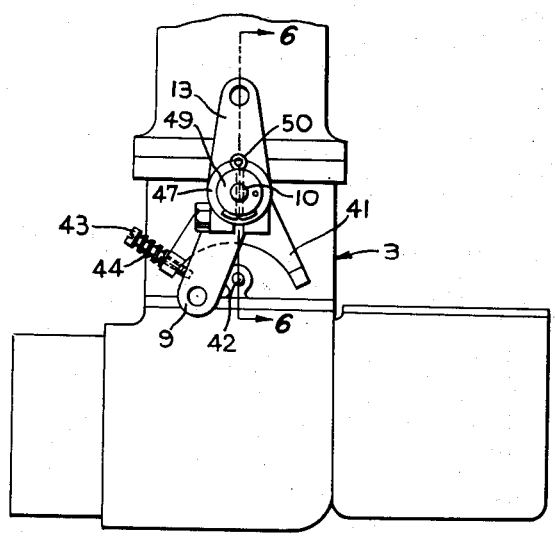
Fig. 5 is an enlarged view of the carburetor.

Fig. 5 shows an enlarged view of the carburetor 3 with particular reference to the manner in which governor throttle lever 13 and throttle limiting lever 9 are mounted on the throttle valve shaft 10. Fig. 6 is a cross section along the axis of shaft 10 taken on line 6—6 of Fig. 5.

Referring to Figs. 5 and 6, the throttle shaft 10 extends through the upper portion of the body of carburetor 3 with one end extended for mounting the lever parts. Inside the carburetor, the throttle valve plate 39 is held in the shaft 10 by means of holding screws 40 in the conventional manner. On the extended end of shaft 10, there is first assembled a double arm, or ear throttle stop lever 41 which is pinned to the shaft in such position as to define the open and closed positions of valve plate 39. These positions are determined by the two ears of lever 41 and the stop pin 42 on the carburetor. In the open position the one ear of lever 41 strikes the side of pin 42 but in the closed position a throttle idle adjusting screw 43 assembled in the opposite ear of lever 41 strikes the pin 42. The screw 43 is used for holding the throttle valve plate slightly open to operate the engine at its idling speed; a spring 44 holds the screw adjustment after it has been made. The throttle limiting lever 9 is next assembled on shaft 10. This lever is not fastened to the shaft directly but is held in position for limited angular movement by clamp 45 which is, however, clamped fast to the shaft 10. See detail of clamp 45 in Figs. 8 and 9.

The clamp 45 may be made from sheet metal and has spaced parallel sides 70 and 71 each of which has split ends as shown in Fig. 8. The sides 70 and 71 are journaled on the throttle shaft 10 and the clamp is fixedly secured to the throttle shaft by a bolt 72 extending normally to the shaft 10. Bolt 72 has a head engaging inwardly turned sections 73 of each side 70 and 71 and a nut 74 engaging recesses 75 in edge portions of each of the sides opposite to each of the inwardly turned sections 73. The throttle limiting lever 9 thus can move between the base of the clamp 45 and the bolt 72.

The lever 9 is free to turn on throttle shaft 10 between the limits of the stop portion of clamp 45 and the nut of the clamp screw for clamp 45, and in operation the lever 9 is positioned by connecting link 8, Fig. 1, and the throttle shaft 10 turns within the lever 9 within the limits set by the clamp 45 as will be later described. Next a pin 46 is assembled in the throttle shaft 10 and then the throttle lever sleeve 47, on which the governor throttle lever 13 is mounted, is slipped into place with a notch 47ᵃ of about 90° circumferential length in the end of the sleeve 47 receiving the pin 46. Finally the torsion spring 48, the spring retainer 49 and retainer cotter pin 50 are assembled. As pin 46 secures the throttle lever sleeve 47 to the throttle shaft 10, such sleeve is free to turn on the shaft through the limits of the recess 47ᵃ. When assembling these last three parts the spring retainer 49 is rotated to give an initial torsion force to the spring 48 that will be sufficient to retain one side of the notch in sleeve 47 against the throttle shaft pin 46. The torsion force is also set high enough to retain the sleeve and pin in contact so that when lever 13, which is clamped to sleeve 47, is moved, it will move the throttle shaft 10 and consequently the throttle valve 39 in either direction unless a special resistance is encountered when the clamp 45 contacts the lever 9 which limits rotation of the throttle shaft. The spring retainer 49 is provided with a plurality of cotter pin holes to permit exact adjustment of the torsion spring. The spring retainer and also the sleeve 47 are provided with holes which receive the extended ends of the torsion spring. The notch 47ᵃ in the end of sleeve 47 is made wide enough to permit the full travel of lever 13 and sleeve 47, as determined by the travel of the governor lever 11, Fig. 2, with the throttle shaft 10 held stationary. Such movement merely moves the sleeve away from the pin 46 and increases the torsion spring force by turning it further. This movement permits me to hold the throttle shaft through the lever 9 and clamp 45 while the governor moves lever 13 without affecting the valve 39.

Fig. 7 is an enlarged side view of the control assembly 5. In this figure, reference 51 is a mounting bracket for attachment to the engine. This bracket will vary in accordance with the needs as determined in each particular engine to be controlled. On an ear 51ᵃ, extended on the bracket so as to bring the control connecting links in line with the governor and carburetor, is mounted a pivot stud 52 upon which in the order named are assembled a metal friction washer 53, a friction disc 54, the control disc lever 55, a friction adjusting spring 56, a retainer washer 57 and retaining nut 58.

The control disc lever 55 has a central disc or circular portion matching the friction disc 54 in size and is provided with three ears or eyes. The eye indicated as 14 is the one connected to the operator's control as previously stated. The eye indicated as 59 is connected through link 8 to the limiting lever 9 and the eye 60 is connected through link 6 to the governor control lever 7. The location of the eyes 59 and 60 are determined both from the geometry of the carburetor and governor and empirically but in general the arrangement is such that for equal increments of travel of eye 14 the governor lever 7 is moved in uniform increments whereas limiting lever 9 moves slowly at first but with increasing increments as the higher speed ranges are reached.

The method of adjusting the control is as follows:

First, with the units 3, 4 and 5 assembled in position but without connecting links 6, 8 and 12 in place the engine is started.

Second, the engine speed is adjusted to the desired idling speed at the carburetor and fixed by means of adjusting screw 43, Fig. 5.

Third, with the control lever 55 of assembly 5 in the off or idling position and with the governor lever 7 also in the idling position, the length of connecting link 6 is adjusted to just fit between eye 60 and eye 37, Fig. 2.

Fourth, with the lever 11, Fig. 2, in the throttle closed position the length of link 12 is adjusted so it will fit between levers 11 and 13 on the carburetor, Figs. 1 and 5. It is important to get this adjustment correct by being sure that the lever 28, Fig. 3, is in contact with the bearing 24. This is easily determined because the rotation of the bearing can be felt at lever 11 when contact is made. The engine is now assembled with governor control and it is only necessary to adjust the limit control.

Fifth, the engine speed is increased to the usual drilling speed range by advancing control lever 55 so that the governor will open the carburetor throttle to give the increased speed. The length of link 8 is now adjusted to fit between eye 59 of lever 55 and lever 9 on the carburetor. Also at this point the clamp 45 is clamped to the shaft 10 in a position to permit a ⅓ opening of the throttle before the lever 9 and clamp 45 limit the throttle opening.

Now, if the engine were put in drilling service, adjusted as just outlined, the governor could only open the throttle about ⅓ in the drilling speed range which has the effect of limiting the power output to ⅓ of the engine's maximum or in other words it has the same effect as if a small engine were used. Yet the governor is not prevented from working in its normal manner for the balance of the governor's action is, as before stated, simply used to turn the torsion spring 48. On the other hand, if full engine power is needed all that is necessary is to advance the control lever 55 so as to advance limiting lever 9 to permit wider throttle valve opening up to full throttle.

The action and setting of the apparatus of the invention is such that the variable speed governor primarily controls the throttle, being only limited at the throttle by lever 9 which is simultaneously controlled with the setting of the variable speed governor by the unitary control 5.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. In a speed range and power control for an internal combustion engine employing a carburetor and a variable speed governor to control the throttle valve of the carburetor, a governor action limiting lever connected to the carburetor throttle valve, a control lever unit connected to control the variable speed governor and simultaneously the governor action limiting lever, and means including a spring loaded variable slip joint connecting the variable speed governor to the throttle valve of the carburetor.

2. In a speed range and power control for an internal combustion engine employing a carburetor and a variable speed governor to control the throttle valve of the carburetor, a control unit comprising a control disc means, means rotatably positioning said control disc means, means for retaining said control disc means in a given position, means connected to one portion of said control disc means for connection to the carburetor to aid in controlling the action of the throttle valve, and means connected to a second portion of said control disc means for connection to the variable speed governor whereby a unitary control for the setting of the carburetor and the variable speed governor is provided.

3. In a speed range and power control for an internal combustion engine employing a carburetor and a variable speed governor to control the throttle valve of the carburetor, a unitary control lever unit comprising a control disc lever, means rotatably positioning said control disc lever, means for retaining said control disc lever in a given position, means connected to one portion of said control disc lever for connection to the carburetor to aid in controlling the action of the throttle valve, and means connected to a second portion of said control disc lever for connection to the variable speed governor; a variable speed governor comprising a governor lever fulcrumed on the governor, a control lever fulcrumed on the governor, and a coil spring connecting a portion of the control lever to a portion of the governor lever, the angle between the longitudinal axis of the spring and a line formed by the point of connection between the spring and the governor lever and the fulcrum of the governor lever being small at an idling speed setting of the governor and approaching a right angle at top high speed setting, said second-named connecting means from said unitary control connecting to said control lever of said variable speed governor; and means connecting said governor lever of said variable speed governor to said carburetor and including spring loaded variable slip joint means.

4. A selectively variable constant speed governor for a prime mover including a movable throttle-control member, centrifugal responsive means driven by the prime mover and tending to reduce the flow of fuel to the prime mover upon increase in speed thereof, spring means tending to increase the flow of fuel to the prime mover and connected to substantially counterbalance the movement of the centrifugally-responsive means, and means mounting the spring means and moved by the throttle-control member to automatically change the strength and direction of application of the spring means to effectively counterbalance the centrifugal responsive means regardless of speed of the prime mover.

5. Apparatus for maintaining the speed of an internal combustion engine substantially constant between ranges of idling to full speed and regardless of the application of loads within the power limits of the engine at the selected speed said apparatus including in combination an internal combustion engine, a carburetor for supplying fuel to the engine, a throttle valve in the carburetor controlling the flow of fuel to the engine from the carburetor, a centrifugal governor driven by the engine, linkage means connecting the governor to the throttle valve to move the valve towards substantially closed idling position when the engine speeds up and to move the valve towards fully open position when the engine slows down, resilient means in said governor counterbalancing the centrifugal action thereof, stop means limiting the throttle valve to about ⅓ of its normal movement from fully open to substantially closed idling position, an adjustably positioned speed control member, connecting means extending between the member and the stop means for repositioning the stop means upon repositioning of the member, lever means connecting the member and the resilient means to change the force of the resilient means to counterbalance the centrifugal action of the governor at a new speed setting occasioned by repositioning the member, and spring means in the linkage means of sufficient strength to insure direct movement of the throttle valve by the governor within the limits of the stop means, but said spring means yielding to allow full movement of the governor although further movement of the throttle valve is prevented by the stop means.

6. Apparatus for maintaining the speed of an internal combustion engine substantially constant between ranges of idling to full speed and regardless of the application of loads within the power limits of the engine at the selected speed said apparatus including in combination an internal combustion engine, a carburetor for supplying fuel to the engine, a throttle valve in the carburetor controlling the flow of fuel to the engine from the carburetor, a variable speed governor driven by the engine, linkage means connecting the governor to the throttle valve to move the valve towards substantially closed idling position when the engine speeds up and to move the valve towards fully open position when the engine slows down, stop means limiting the throttle valve to less than about one-half of its normal movement from fully open to substantially closed idling position, an adjustably positioned speed control member, connecting means extending between the member and the stop means for repositioning the stop means upon repositioning of the member, lever means connecting the member and the governor to position the governor at a new speed setting occasioned by repositioning the member, and spring means in the linkage means of sufficient strength to insure direct movement of the throttle valve by the governor within the limits of the stop means, but said spring means yielding to allow full movement of the governor although further movement of the throttle valve is prevented by the stop means.

7. Apparatus for maintaining the speed of an internal combustion engine substantially constant between ranges of idling to full speed and regardless of the application of loads within the power limits of the engine at the selected speed said apparatus including in combination an internal combustion engine, a carburetor for supplying fuel to the engine, a throttle valve in the carburetor controlling the flow of fuel to the engine from the carburetor, a variable speed governor driven by the engine, linkage means connecting the governor to the throttle valve to move the valve towards substantially closed idling position when the engine speeds up and to move the valve towards fully open position when the engine slows down, stop means limiting the throttle valve to less than about one-half of its normal movement from fully open to substantially closed idling position, an adjustably positioned speed control member, connecting means extending between the member and the stop means for repositioning the stop means upon repositioning of the member, and lever mean connecting the member and the governor to position the governor at a new speed setting occasioned by repositioning the member.

8. In a speed range and power control for an internal combustion engine, the combination of a fuel metering means, a selectively variable constant speed governor connected to operate the fuel metering means from its no load setting to its full load setting and vice versa in response to speed variations from any selected speed, a governor action limiting means associated with said fuel metering means and limiting the movement of the fuel metering means to a fixed predetermined fractional part of the governor action, compensating means interposed between said governor and said governor action limiting means to provide for full movement of the governor action although the movement of the fuel metering means is limited by the governor action limiting means, and a unitary control means connected to the governor and the governor action limiting means for simultaneously selecting the speed setting of the governor and the position of the governor action limiting means, said unitary control means being so constructed and arranged that the movement of the speed setting of the governor is at one rate and the movement of the governor action limiting means is at another rate or rates selected to suit the speed and power required of the engine.

9. In a speed range and power control for an internal combustion engine, the combination of a fuel metering means, a selectively variable constant speed governor connected to operate the fuel metering means from its no load setting to its full load setting and vice versa in response to speed variations from any selected speed, a governor action limiting means associated with said fuel metering means and limiting the movement of the fuel metering means to a fixed predetermined fractional part of the governor action, compensating means interposed between said governor and said governor action limiting means to provide for full movement of the governor action although the movement of the fuel metering means is limited by the governor action limiting means, and a unitary control means connected to the governor and the governor action limiting means for simultaneously selecting the speed setting of the governor and the position of the governor action limiting means.

References Cited in the file of this patent

UNITED STATES PATENTS

| Number | Name | Date |
|---|---|---|
| 1,032,434 | Seaman | July 16, 1912 |
| 1,259,090 | Ferris et al. | Mar. 12, 1918 |
| 1,701,274 | Rabbidge | Feb. 5, 1929 |
| 2,039,495 | Schlosser | May 5, 1936 |
| 2,225,883 | Palmer | Dec. 24, 1940 |
| 2,369,426 | Benjamin | Feb. 13, 1945 |
| 2,443,084 | Rhodes | June 8, 1948 |
| 2,539,738 | Grim et al. | Jan. 30, 1951 |
| 2,602,654 | Parker | July 8, 1952 |
| 2,635,596 | Adler | Apr. 21, 1953 |